(12) United States Patent
Cramer et al.

(10) Patent No.: US 11,769,532 B2
(45) Date of Patent: Sep. 26, 2023

(54) GENERATION AND DISTRIBUTION OF A DIGITAL MIXTAPE

(71) Applicant: Spotify AB, Stockholm (SE)

(72) Inventors: Henriette Susanne Martine Cramer, San Francisco, CA (US); Sarah Mennicken, San Francisco, CA (US); Kurt Jacobson, Stoneham, MA (US); Rohit Kumar, Austin, TX (US); Henrik Lindström, Stockholm (SE); Karl Humphreys, London (GB); Jennifer Thom-Santelli, Medford, MA (US); Robert L. Williams, Arlington, MA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/573,191

(22) Filed: Sep. 17, 2019

(65) Prior Publication Data

US 2021/0082470 A1 Mar. 18, 2021

(51) Int. Cl.
| | | |
|---|---|---|
| *G06F 17/00* | (2019.01) | |
| *G11B 27/034* | (2006.01) | |
| *G06F 16/68* | (2019.01) | |
| *H04N 21/2387* | (2011.01) | |
| *G11B 27/10* | (2006.01) | |
| *G06F 3/16* | (2006.01) | |

(52) U.S. Cl.
CPC ............ *G11B 27/034* (2013.01); *G06F 3/165* (2013.01); *G06F 3/167* (2013.01); *G06F 16/68* (2019.01); *G11B 27/105* (2013.01); *H04N 21/2387* (2013.01)

(58) Field of Classification Search
CPC ... G11B 27/031; G11B 27/034; G11B 27/105; G06F 3/165; G06F 3/167; G06F 16/68; H04N 21/233; H04N 21/2387; H04N 21/2668; H04N 21/4788; H04N 21/6581; H04N 21/8113
USPC ......................................................... 700/94
See application file for complete search history.

(56) References Cited

U.S. PATENT DOCUMENTS

| | | | | |
|---|---|---|---|---|
| 8,316,015 | B2* | 11/2012 | Svendsen ................ | G06F 3/048 707/722 |
| 9,229,938 | B1* | 1/2016 | Jaini ..................... | G06F 16/4387 |
| 11,134,291 | B2* | 9/2021 | Corbin ............. | H04N 21/26258 |
| 11,468,004 | B2* | 10/2022 | Jellison, Jr. .......... | G06F 16/4393 |
| 2004/0116088 | A1* | 6/2004 | Ellis ....................... | H04H 60/16 455/132 |
| 2006/0248209 | A1* | 11/2006 | Chiu ...................... | G06Q 30/02 709/231 |
| 2007/0300260 | A1* | 12/2007 | Holm ................. | H04N 21/8173 725/47 |

(Continued)

OTHER PUBLICATIONS

Hix, Cassette Revolution (Year: 2015).*
Airtime Pro Radio Automation platform (Year: 2017).*

*Primary Examiner* — Paul C McCord
(74) *Attorney, Agent, or Firm* — Merchant & Gould P.C.

(57) ABSTRACT

A system for generating and distributing a digital mixtape. In one example, the system can receive a user command to generate a digital mixtape including a user-defined compilation of music. The user command identifies a recipient of the digital mixtape and identifies one or more media content items to be included in the music compilation for the recipient. The digital mixtape can also include audio recordings from the user to be added to the digital mixtape.

28 Claims, 11 Drawing Sheets

(56) References Cited

U.S. PATENT DOCUMENTS

| | | | |
|---|---|---|---|
| 2008/0092182 A1* | 4/2008 | Conant | H04N 21/2543 348/E7.071 |
| 2009/0099919 A1* | 4/2009 | Schultheiss | G06Q 30/0207 705/14.1 |
| 2009/0259474 A1* | 10/2009 | Lien | B42D 15/022 704/272 |
| 2010/0110200 A1* | 5/2010 | Lau | H04N 21/2743 348/207.1 |
| 2010/0223314 A1* | 9/2010 | Gadel | H04L 51/38 709/200 |
| 2011/0060998 A1* | 3/2011 | Schwartz | G06F 16/954 715/738 |
| 2011/0066438 A1* | 3/2011 | Lindahl | H04M 1/72403 704/258 |
| 2011/0185279 A1* | 7/2011 | Ingkavet | H04M 3/53366 715/727 |
| 2013/0110772 A1* | 5/2013 | Svendsen | G06F 16/435 707/609 |
| 2013/0178961 A1* | 7/2013 | Ly | G11B 27/031 700/94 |
| 2014/0214917 A1* | 7/2014 | Jellison, Jr. | H04H 40/09 709/202 |
| 2014/0316789 A1* | 10/2014 | Lowe | G10L 19/26 704/500 |
| 2016/0226943 A1 | 8/2016 | Klein, Jr. et al. | |
| 2016/0246463 A1 | 8/2016 | Reese et al. | |
| 2016/0337421 A1* | 11/2016 | Krawczyk | H04L 51/24 |
| 2017/0257414 A1* | 9/2017 | Zaletel | G06F 16/252 |
| 2018/0060320 A1 | 3/2018 | Oganian | |
| 2019/0020853 A1* | 1/2019 | Segal | H04N 21/4722 |
| 2020/0285440 A1* | 9/2020 | Prindle | G06F 16/9566 |
| 2020/0344190 A1* | 10/2020 | Ellsworth | G06F 16/4387 |
| 2022/0414793 A1* | 12/2022 | Akintunde | H04M 1/72442 |

\* cited by examiner

GENERATION AND DISTRIBUTION OF A DIGITAL MIXTAPE

BACKGROUND

People enjoy creating customized collections of music and sharing them with friends. In the past, people used cassette players and recorders to compile a customized collection of music for a friend on a cassette tape, often referred to as a mixtape. The mixtape could then be personally given to the friend, or sent through the mail, so that the friend could listen to it.

In more recent times, many people no longer own personal collections of music from which a mixtape can be generated, and media playback systems do not readily permit re-recording of that content. Instead, many people now obtain their music from online music streaming services. While online music streaming services allow users to access a large catalog of music, the ability to compile customized collections of music, and share music with others, is limited.

SUMMARY

The present disclosure provides systems, methods, and computer readable products for generating a user-defined compilation of media content, at least in part from a catalog of media content, and share it with friends over a data communication network. Voice messages or other audio can be added to the compilation to further customize the compilation for the recipient.

One aspect is a method for generating a digital mixtape including a user-defined compilation of media content for sharing with another user, the method comprising: receiving a user request from a user, the user request including information identifying another user and a media content descriptor; determining at least one media content item based on the media content descriptor; obtaining at least one user-generated audio recording; generating a media object identifying the at least one media content item and the at least one user-generated audio recording; and providing the other user with access to the media object to playback the at least one media content item and the at least one user-generated audio recording.

Another aspect is a system for providing a digital mixtape including a user-defined compilation of media content items for sharing with another user, the system comprising: a media streaming application stored in memory of a voice interactive device; a media server in communication with the media streaming application, the media server including: a memory processing unit; and a memory storing instructions that, when executed by the processing unit, causes the media server to: receive a user request from a user, the user request including information identifying another user and a media content descriptor; determine at least one media content item based on the media content descriptor; obtain at least one user-generated audio recording; generate a media object identifying the at least one media content item and the at least one user-generated audio recording; and provide the other user with access to the media object to playback the at least one media content item with the at least one user-generated audio recording.

Yet another aspect is one or more non-transitory computer readable storage devices storing data instructions that, when executed by at least one processing device, cause the at least one processing device to: receive a user request from a user, the user request including information identifying another user and a media content descriptor; determine at least one media content item based on the media content descriptor; obtain at least one user-generated audio recording; generate a media object identifying the at least one media content item and the at least one user-generated audio recording; and provide the other user with access to the media object to playback the at least one media content item and the at least one user-generated audio recording.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers unless otherwise indicated.

DETAILED DESCRIPTION

Figure 1:
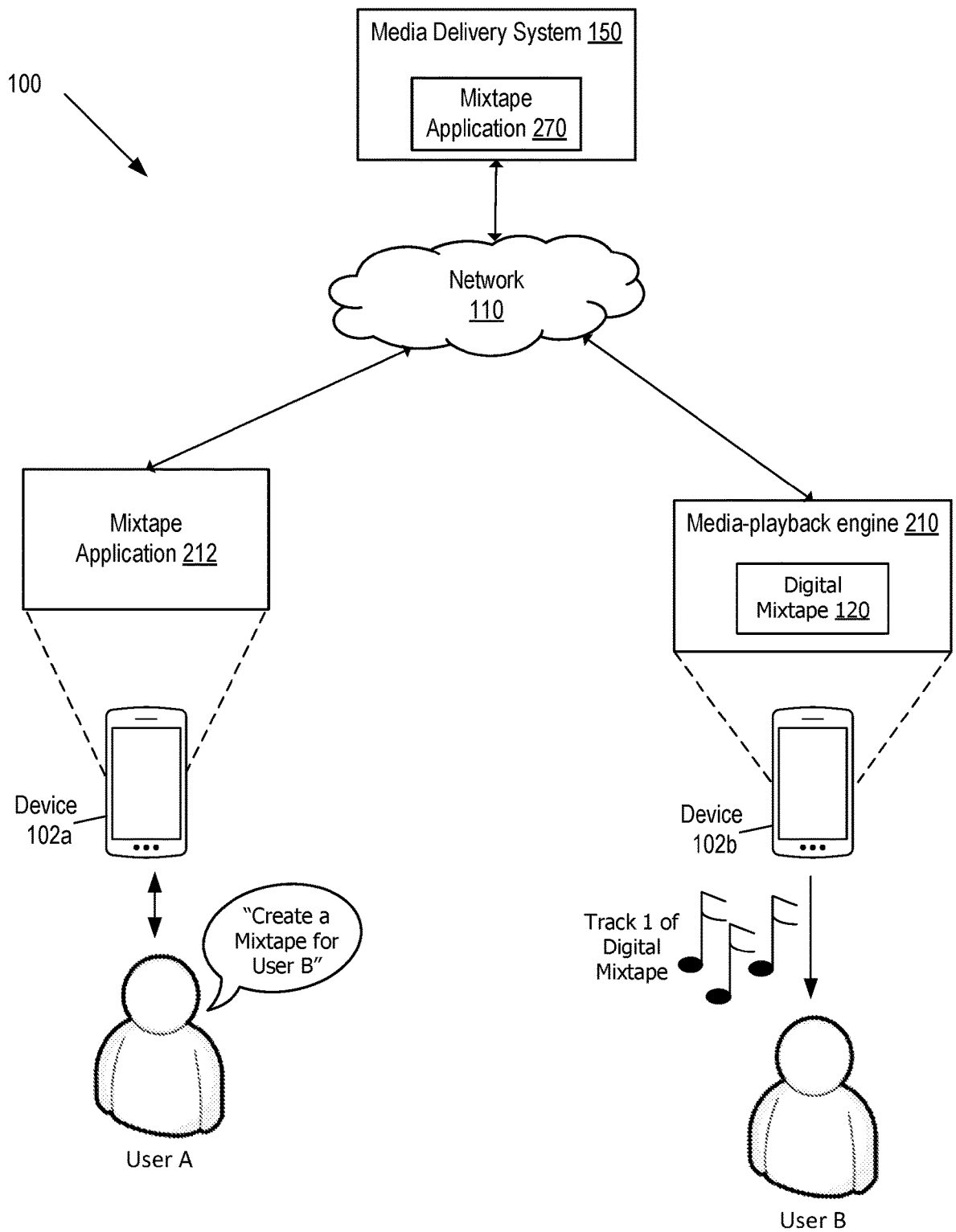
FIG. 1 illustrates an example system for generating and distributing a digital mixtape.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The example embodiments presented herein are directed to systems, methods, and non-transitory computer-readable medium products that allow the generation of digital mixtapes and distribution (e.g., sharing) of digital mixtapes between users involving a media delivery system.

The examples described herein describe devices and methods usable for generating and distributing a digital mixtape. In some embodiments, the digital mixtape includes at least one media content item and at least one user-generated audio recording. A first user (also known as a creating user) creates the digital mixtape and shares it with a second user (also known as a recipient user). The second user is then able to receive and play the digital mixtape. An example digital mixtape includes a recorded audio introduction, a plurality of media content items, such as a plurality of songs, and a recorded audio transition. In some embodiments the digital mixtape is stored as a media object data package for distribution to the recipient user.

FIG. 1 illustrates an example system 100 for generating and distributing a digital mixtape 120. In this example, the system 100 includes user devices 102 (including 102a and 102b) and a media delivery system 150. The user devices include at least a user device 102a of a creating user A and a user device 102b of recipient user B. User device 102a, user device 102b, and media delivery system 150 are communicatively connected for data communication across network 110.

In some embodiments the system 100 includes a mixtape application. The mixtape application can be provided one or both of user devices 102 and media delivery system 150. For example, the user device 102a includes mixtape application 212 and media delivery system 150 includes mixtape application 270. The mixtape applications 212 and 270 work together in some embodiments to accomplish the functions of the mixtape application described herein. In some embodiments the mixtape application 212 is also on the user device 102b.

In some embodiments, one or both of the user devices 102 include a media-playback engine 210. For example, in FIG. 1 the user device 102b is shown as including the media-playback engine 210. The media-playback engine 210 is capable of receiving and playing a digital mixtape 120 to the recipient user B at the user device 102b.

In use, creating user A interacts with the system 100 to generate a digital mixtape 120 for user B. Then, the system 100 allows the user A to share the digital mixtape 120 with recipient user B. The digital mixtape 120 is played for recipient user B. One or more user commands are received to generate a digital mixtape that includes a user-defined compilation of media content, such as music. The one or more user commands can identify a recipient user B of such a digital mixtape 120 and may include one or more descriptors that are used to select media content to be included in the music compilation of the digital mixtape for the recipient user. By way of example, the tracks can be selected, and user-generated audio recordings can be added to the compilation. Then the digital mixtape can be shared with the recipient user B.

Figure 2:
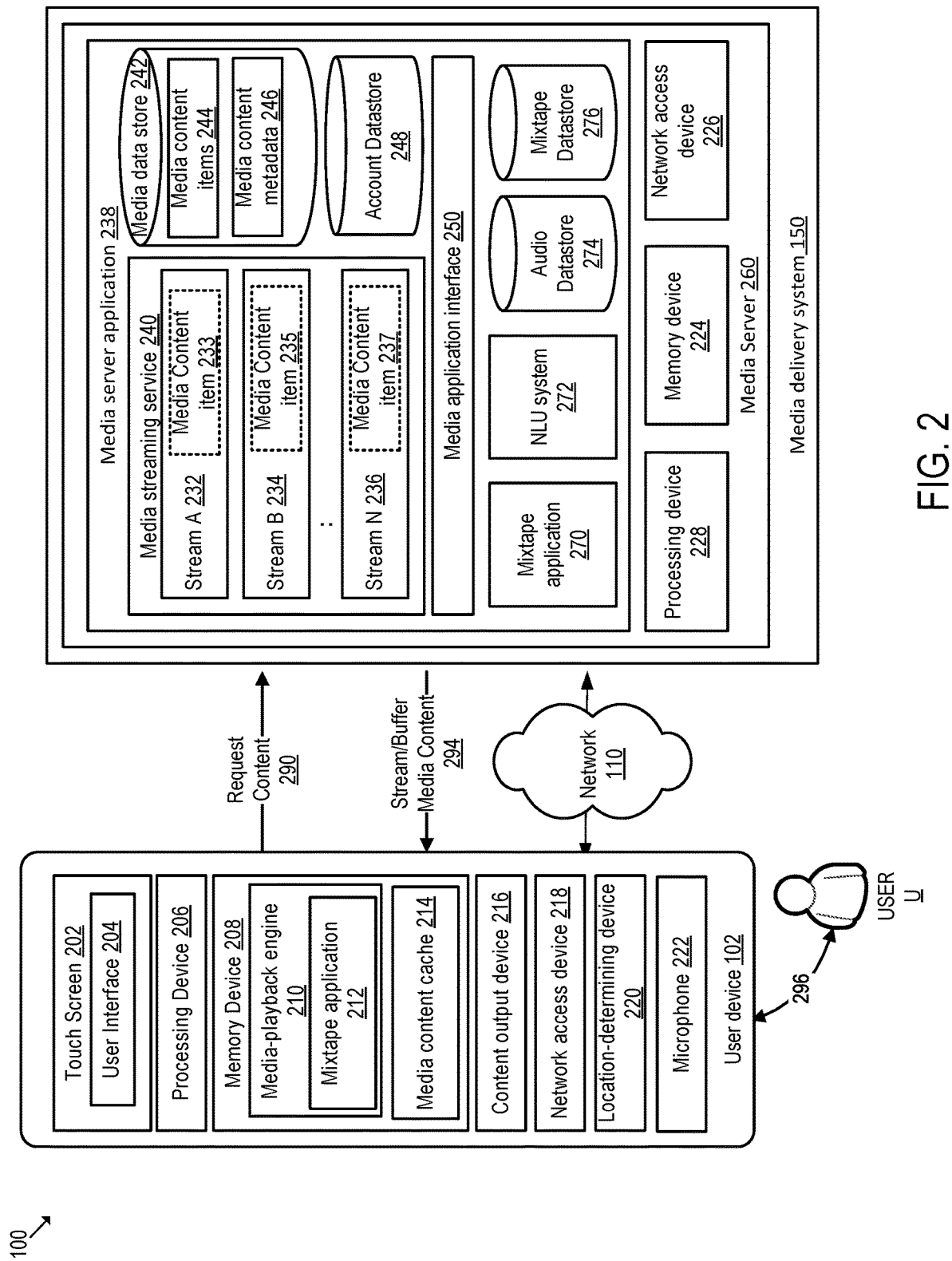
FIG. 2 is schematic block diagram of another example system for generating and distributing a digital mixtape.

FIG. 2 is a schematic block diagram of another example of the system 100 for generating and distributing a digital mixtape, shown in FIG. 1. In this example, the system includes the user device 102 and the media delivery system 150.

Although only one user device 102 is shown, user device 102 represents any number of connected user devices 102. Specifically, the user device 102 is an example of either of the user devices 102a or 102b, shown in FIG. 1, or any other user device described herein. In some embodiments, user device 102 can issue requests to access media content at a media server 260, for example, to stream music, video, audio books, podcasts or other forms of media content to user device 102. In response, the media server 260 can populate a media content buffer with corresponding items of media content. The media server 260 can also communicate the selected media content to user device 102. Alternatively, in some embodiments, the user device 102 plays media content items stored locally on the user device 102. Further, in at least some embodiments, the user device 102 plays media content items that are stored locally as well as media content items provided by other systems. Examples of the user device 102 include a computing device, handheld entertainment device, smartphone, tablet, watch, wearable device, gaming system, smart television system (such as including an Amazon® Fire® TV Stick device, or an Apple® tv digital media extender) or any other type of device capable of playing media content.

Although for purposes of illustration a user device 102 and media server 260 are shown, media delivery system 150 can support simultaneous use of a plurality of user devices 102. Similarly, user device 102 can access media content items 233, 235, 237 provided by a plurality of media servers 260, or switch between different media streams 232, 234, 236 provided by one or more media servers 260.

In at least some embodiments, the user device 102 includes a touch screen 202, a processing device 206, a memory device 208, a content output device 216, a network access device 218, and a location-determining device 220. Other embodiments may include additional, different, or fewer components. For example, some embodiments do not include one or more of the location-determining device 220 or the touch screen 202.

The location-determining device 220 is a device that determines the location of the user device 102. In some embodiments, the location-determining device 220 uses one or more of the following technologies: Global Positioning System (GPS) technology that may receive GPS signals from satellites, cellular triangulation technology, network-based location identification technology, wireless network technology (e.g., WI-FI) positioning systems technology, and combinations thereof.

The user device 102 may also include a microphone 222. The microphone 222 can be used to capture audio from the user and/or the external environment. In an embodiment, the recording from the microphone 222 is stored locally at the memory device 208. In another embodiment, the microphone 222 communicates with an audio datastore 274 at the media server application 238 to store audio recordings.

The touch screen 202 operates to receive an input 296 from a selector (e.g., a finger, stylus, etc.) controlled by the user U. In some embodiments, the touch screen 202 operates as both a display device and a user input device. In some embodiments, the touch screen 202 detects inputs based on one or both of touches and near-touches. In some embodiments, the touch screen 202 displays a user interface 204 for interacting with the user device 102. As noted above, some embodiments do not include a touch screen 202. Some embodiments include a display device and one or more separate user interface devices. Further, some embodiments do not include a display device.

The user interface 204 is adapted to display media options, for example as an array of media tiles, thumbnails, or other formats, and can determine a user interaction or input. Selecting a particular media option, for example a particular media tile or thumbnail, can be used as a command by a user and/or the media device, to the media server, to download, stream or otherwise access a corresponding particular media content item or stream of media content.

Examples of the user interface 204 include input control devices that control the operation and various functions of the user device 102. Input control devices include any components, circuitry, or logic operative to drive the functionality of the user device 102. For example, input control device(s) include one or more processors acting under the control of an application.

The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touch screen displays, such as capacitive and resistive-type touch screen displays.

In some embodiments, the processing device 206 comprises one or more central processing units (CPU). In other embodiments, the processing device 206 additionally or alternatively includes one or more digital signal processors, field-programmable gate arrays, or other electronic circuits.

The memory device 208 operates to store data and instructions. In some embodiments, the memory device 208 stores instructions for a media-playback engine 210 that includes the mixtape application 212. In some embodiments, the media-playback engine 210 selects and plays back media content and generates interfaces for selecting and playing back media content items.

Some examples of the memory device 208 also include a media content cache. The media content cache stores media content items, such as media content items that have been previously received from the media delivery system 150. The media content items stored in the media content cache are storable in an encrypted or unencrypted format, and decryption keys for some or all of the media content items are also stored. The media content cache can also store metadata about media content items such as title, artist name, album name, length, genre, mood, or era. The media content cache can also store playback information about the media content items, such as the number of times the user has requested to playback the media content item or the current location of playback.

The media-playback engine 210 includes a mixtape application 212. Mixtape application 212 communicates with user interface 204 to receive an indication that a digital mixtape is desired to be generated by the user U. The mixtape application 212 communicates with media server application 238 to identify media content items used to generate the digital mixtape. Also, as described below, mixtape application 212 communicates with microphone 222 to receive an utterance, convert the utterance to text, and determine that the utterance is a desire by the user to generate a digital mixtape.

The mixtape application 212 includes one or more hardware and/or software components operative to provide digital mixtape functionality. Digital mixtape management functionality includes one or more of selecting a destination or recipient user, uploading an audio introduction, uploading one or more audio transition, selecting one or more individual songs, removing one or more individual songs, and playing the digital mixtape, among other functionality. In an example, the mixtape application 212 receives a command from a first user and executes a command based thereon. Many operations performed by the mixtape application 212 include interacting with a media server application 238. The digital mixtape application 270 may also be located at the media server application 238, which is described in more detail below.

Some embodiments of the memory device 208 also include a media content cache 214. The media content cache 214 stores media content items, such as media content items that have been previously received from the media delivery system 150. The media content items stored in the media content cache 214 may be stored in an encrypted or unencrypted format. The media content cache 214 can also store decryption keys for some or all of the media content items that are stored in an encrypted format. The media content cache 214 can also store metadata about media content items such as title, artist name, album name, length, genre, mood, era, etc. The media content cache 214 can also store playback information about the media content items, such as the number of times the user has requested to playback the media content item or the current location of playback (e.g., when the media content item is an audiobook, podcast, or the like from which a user may wish to resume playback).

The memory device 208 typically includes at least some form of computer-readable media. Computer readable media includes any available media that can be accessed by the user device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY DISCS, digital versatile discs or other optical storage, magnetic cassettes, magnetic tape, magnetic disk storage or other magnetic storage devices, or any other medium that can be used to store the desired information and that can be accessed by the user device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 216 operates to output media content. In some embodiments, the content output device 216 generates media output for the user U that is surrounded by the selected users. Examples of the content output device 216 include a speaker assembly comprising one or more speakers, an audio output jack, a BLUETOOTH transmitter, a display panel, and a video output jack. Other embodiments are possible as well. For example, the content output device 216 may transmit a signal through the audio output jack or BLUETOOTH transmitter that can be used to reproduce an audio signal by a connected or paired device such as headphones, speaker system, or vehicle head unit.

The network access device 218 operates to communicate with other computing devices over one or more networks, such as the network 110. Examples of the network access device include one or more wired network interfaces and wireless network interfaces. Examples of wireless network interfaces include infrared, BLUETOOTH wireless technology, 802.11a/b/g/n/ac, and cellular or other radio frequency interfaces.

The network 110 is an electronic communication network that facilitates communication between the user device 102 and the media delivery system 150. An electronic communication network includes a set of computing devices and links between the computing devices. The computing devices in the network use the links to enable communication among the computing devices in the network. The network 110 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 110 includes various types of links. For example, the network 110 can include wired and/or wireless links, including BLUETOOTH, ultrawideband (UWB), 802.11, ZIGBEE, cellular, and other types of wireless links. Furthermore, in various embodiments, the network 110 is implemented at various scales. For example, the network 110 can be implemented as one or more vehicle area networks, local area networks (LANs), metropolitan area networks, subnets, wide area networks (such as the Internet), or can be implemented at another scale. Further, in some embodiments, the network 110 includes multiple networks, which may be of the same type or of multiple different types.

The media delivery system 150 comprises one or more computing devices and provides media content items to the user device 102 and, in some embodiments, other media-playback devices as well. The media delivery system 150 includes a media server 260. Although FIG. 2 shows a single media server 260, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 260 transmits stream media 294 to media-playback devices such as the user device 102. In some embodiments, the media server 260 includes a media server application 238, media application interface 250, digital mixtape application 270, an NLU system 272, audio datastore 274, a digital mixtape datastore 276 a processing device 228 a memory device 224, and a network access device 226. The processing device 228, memory device 224, and network access device 226 may be similar to the processing device 228, memory device 208, and network access device 218 respectively, which have each been previously described.

In some embodiments, the media server application 238 streams music or other audio, video, audio books, podcosts, or other forms of media content. The media server application 238 includes a media streaming service 240, a media data store 242, a media application interface 250, and a digital mixtape application 270. The media streaming service 240 operates to buffer media content such as media content items 233, 235, and 237, for streaming to one or more streams 232, 234, and 236.

Media server 260 can provide a subscription-based media streaming service 240, for which user device 102 or user can have an associated account and credentials, and which enable the user device 102 to communicate with and receive content from the media server 260. A received media-access request from user device 102 can include information such as, for example, a network address, which identifies a user device 102 to which the media server 260 should stream or otherwise provide media content items 233, 235, 237, in response to processing the media-access request.

The media application interface 250 can receive requests or other communication from user device 102 or other systems, to retrieve media content items from the media server 260. For example, the media application interface 250 receives communication 290 from the media-playback engine 210.

In some embodiments, the media data store 242 stores media content items 244 and media content metadata 246. The media data store 242 may comprise one or more databases and file systems. As noted above, the media content items 244 may be audio, video, movies, audio books, podcasts or any other type of media content, which may be stored in any format for storing media content. In some embodiments the media data store 242 also includes playlists and playlist data.

Media content items 244 can include media content, for example, music, songs, videos, movies, audio books, podcasts, or other media content, together with metadata describing that media content. The metadata can be used to enable users and user device 102 to search within repositories of media content, to locate particular media content items.

The media content metadata 246 operates to provide various information associated with the media content items 244. In some embodiments, the media content metadata 246 includes one or more of title, artist name, album name, length, genre, mood, era, etc. The digital mixtape application 270 operates to identify one or more media content items 233, 235, 237 (or snippets thereof) and arrange them in a particular order. The digital mixtape application 270 also identifies one or more audio recording (or snippets thereof) from a user and places them in a particular order. The at least one or more media content items 233, 235, 237 and audio recordings are intermixed as indicated by the user.

The account data store 248 is used to identify users. In an example, the account data store 248 is used to identify users of a media streaming service provided by the media delivery system 150. In some examples, the media delivery system 150 authenticates a user via data contained in the account data store 248 and provides access to resources (e.g., media content items, digital mixtapes, etc.) to a device operated by a recipient user. In some examples, different devices log into a single account and access data associated with the account in the media delivery system 150. User authentication information, such as a username, an email account information, a password, and other credentials, can be used for the user to log into his or her user account. A device can use stored credentials to log a user into the account on a device.

The digital mixtape application 270 can receive requests or other communication 290 from user device 102 or other systems to generate and/or retrieve a digital mixtape for playback to a selected user. Digital mixtape application 270 communicates with NLU system 272, audio datastore 274, and digital mixtape datastore 276.

The natural language understanding (NLU) system 272 receives data representative of the request (e.g., from the user device 102) and provides an output that causes the media server 260 to stream one or more media content items associated with a digital mixtape to the user device 102.

Audio datastore 274 stores audio recordings created by the creating user for inclusion within a digital mixtape. In some embodiments the audio datastore 274 also stores information related to the audio recordings created by the user (as discussed in further detail herein with reference to the audio recording datastore 630 shown in FIG. 6). The audio recordings may be audio introductions and audio transitions. The audio recordings can be generated by a user speaking into a microphone 222 or a user device 102, for example, and then transmitted to the media delivery system 150 (such as by interaction between the mixtape application 212 and mixtape application 270) for storage in the audio datastore 274. Audio recordings may be recordings of the user speaking or singing, or other things the user records, such as a dog barking, a baby babbling, the user playing a musical instrument, or any other desired content. The creating user can also include the voice or sounds from others, such as a mutual friend, a family member, a celebrity, or sounds from another person, device, or object.

Digital mixtape datastore 276 can store digital mixtapes and information related to digital mixtapes created by a user. In some embodiments the digital mixtapes are stored as media objects 650, as discussed in further detail with reference to FIG. 6. Information relating to digital mixtapes can be stored in a digital mixtape datastore 640, also described in more detail with reference to FIG. 6. In some embodiments, the digital mixtape includes both audio recording content from a creating user, and selected media content items selected by the creating user. The digital mixtape datastore typically also stores an identification of the creating user and of the recipient user.

The digital mixtape datastore 276 includes data regarding the digital mixtapes. In an example, the digital mixtape datastore 276 includes a digital mixtape table (shown in more detail at FIG. 6) that stores data regarding one or more digital mixtapes. For instance, the digital mixtape table identifies each digital mixtape by a digital mixtape identifier (e.g., a unique identifier, uniform resource identifier, or path to the digital mixtape). The table includes various data regarding a corresponding digital mixtape. Examples of such data include a digital mixtape title (e.g., a name of the digital mixtape given by an author of the digital mixtape), a list of user-generated audio items associated with the digital mixtape (e.g., an introduction and transitions), and a list of media content items associated with the digital mixtape (e.g., the media content items contained in the digital mixtape), among other data.

Each of the user device 102 and the media delivery system 150 can include additional physical computer or hardware resources. In at least some embodiments, the user device 102 communicates with the media delivery system 150 via the network 110.

Although in FIG. 2 only a single user device 102 and media delivery system 150 are shown, in accordance with some embodiments, the media delivery system 150 can support the simultaneous use of multiple media-playback devices, and the media-playback device can simultaneously access media content from multiple media-delivery systems. Additionally, although FIG. 2 illustrates a streaming media based system for media playback, other embodiments are possible as well. For example, in some embodiments, the user device 102 includes a media data store 242 and the user device 102 is configured to select and playback media content items without accessing the media delivery system 150. Further, in some embodiments, the user device 102 operates to store previously streamed media content items in a local media data store (e.g., the media content cache 214).

In at least some embodiments, the media delivery system 150 can be used to stream, progressively download, or otherwise communicate music, other audio, video, movies, audio books, podcasts or other forms of media content items to the user device 102 for playback during travel on the user device 102. In accordance with an embodiment, a user U can direct input 296 to the user interface 204 to issue requests, for example, to generate a digital mixtape for playback on a recipient user device 102.

In many examples, the media server 260 includes the NLU system 272 and a digital mixtape datastore 276. In some examples, the NLU system 272 and the digital mixtape datastore 276 are partially located at the user device 102. In some examples, the NLU system 272 and the digital mixtape datastore 276 are entirely located at the user device 102. For instance, the user device 102 stores data in the digital mixtape datastore 276 regarding digital mixtapes stored locally to the user device 102.

Figure 3:
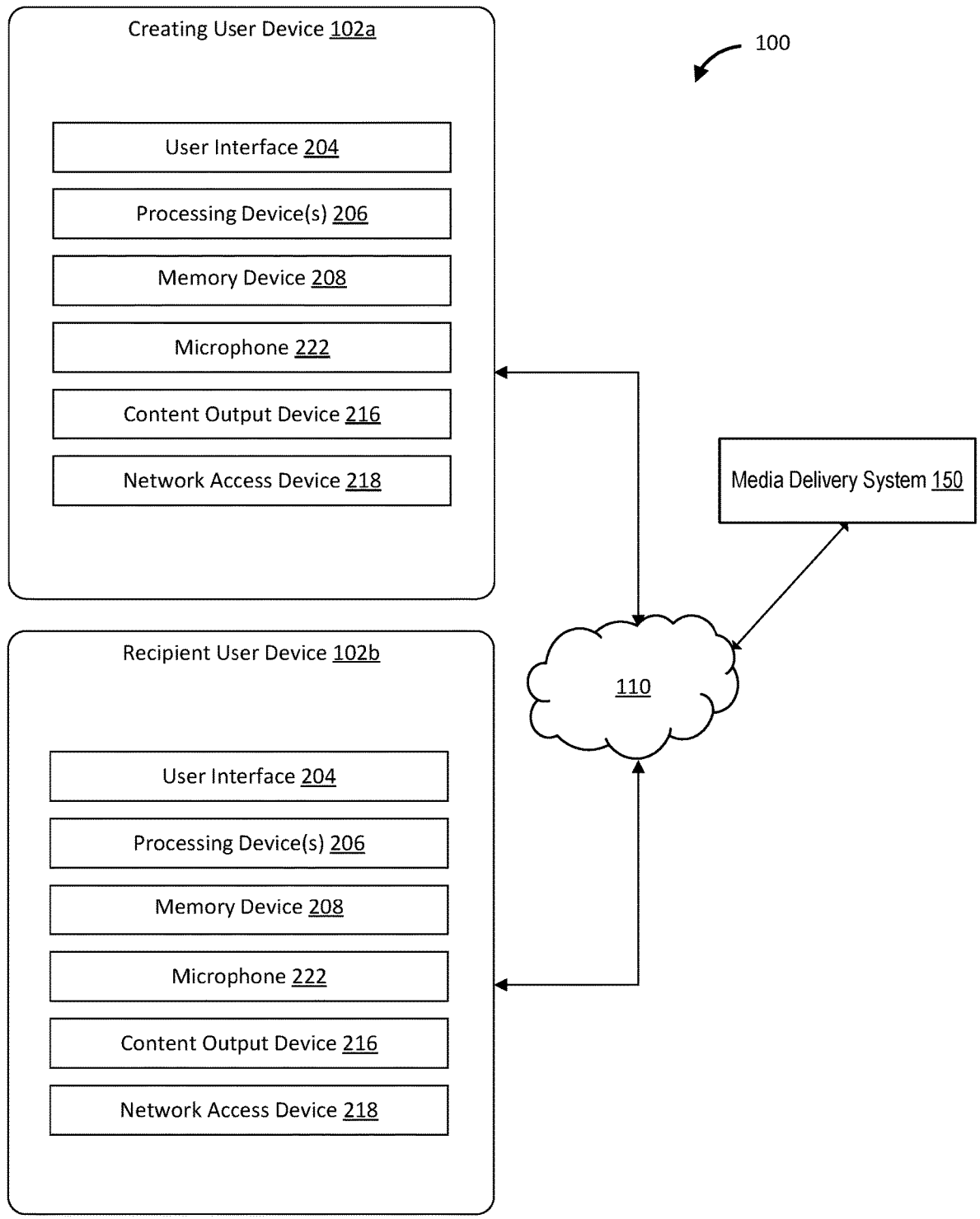
FIG. 3 is a schematic block diagram illustrating aspects of the system shown in FIG. 1.

FIG. 3 is a schematic block diagram illustrating aspects of the system shown in FIG. 1, including the creating user device 102a, the recipient user device 102b, and the media delivery system 150. In this example, the creating user device 102 is the device of a creating user A who interacts with the system 100 to create the digital mixtape, and the recipient user device 102b is the device of the recipient user.

The creating user device 102a is a computing device. In some examples, the creating user device 102a is a computing device that is used to generate a digital mixtape including a user-defined compilation of media content items. In some examples, the media content items are provided by the media delivery system 150 and transmitted to the creating user device 102a using the network 110. Media content items can be transmitted as a whole, or by streaming. A media content item is an item of media content, including audio, video, movies, audio books, podcosts or other types of media content, which may be stored in any format suitable for storing media content. Non-limiting examples of media content items include songs, music, albums, audiobooks, music videos, movies, television episodes, audio books, podcasts, other types of audio or video content, and portions or combinations thereof.

The creating user device 102a selects and compiles media content items and user-generated audio recordings to define the digital mixtape 120 (FIG. 1). In some examples, the creating user device 102a receives user input over a user interface 204, such as a touch-screen user interface, an utterance-based user interface, tactile user interfaces, virtual user interfaces, or other user interfaces, adds media content items to the digital mixtape 120, and plays one or more media content items based thereon (such as to preview the media content items or the digital mixtape 120).

In some examples, the creating user device 102a is a computing device, handheld entertainment device, smartphone, tablet, watch, wearable device, gaming system, smart television system (such as including an Amazon® Fire® TV Stick device, or an Apple® TV digital media extender) or any other type of device capable of playing media content. In yet other examples, the creating user device 102a is a media playback appliance, such as an in-dash vehicle head unit, an aftermarket vehicle media playback appliance, a smart assistant device, a smart home device, a television, a gaming console, a set-top box, a network appliance, a BLU-RAY disc player, a DVD player, a media player, a stereo system, smart speaker, an Internet-of-things device, or a radio, among other devices or systems.

In many examples, the creating user device 102a includes a user interface 204, one or more creating user device processing devices 228, and a creating user device memory device 208. In an example, the creating user device 102a includes a content output device 216. In an example, the creating user device 102a includes a network access device 218. In an example, the creating user device 102a includes a microphone 222. Other examples may include additional, different, or fewer components.

The recipient user device 102b can include one or more of the same components as the creating user device 102a. In some embodiments, the aspects described herein are relevant to the creating user device 102a and are also applicable to the recipient user device 102b.

In an example, the recipient user device 102b has one or more processing devices 228 coupled to a memory device 208 storing recipient user device instructions which when executed causes the one or more processing devices 228 to perform one or more operations described herein.

The one or more processing devices 228 include one or more processing units, such as central processing units (CPU), digital signal processors, and field-programmable gate arrays, among others. The memory device 208 operates to store data and instructions.

The memory device 208 stores instructions to perform one or more operations described herein. Some examples of the memory device 208 also include a media content cache (e.g., a media content cache as described above in relation to the creating user device memory device 208). The recipient user device memory device 208 typically includes at least some form of computer-readable media (e.g., computer-readable media as described above in relation to the creating user device memory device 208).

In some embodiments the recipient user device 102b receives a digital mixtape for playback to a user of the recipient user device 102b. In some embodiments the digital mixtape is transmitted in the form of a media object, which is stored in the memory device 208. The media object is usable by the recipient user device 102b to play the digital mixtape to the user of the recipient user device 102b. The media object can include the digital data for the media content items, or can include links or other identifiers usable to play the media content items from the media delivery system 150. Links can include URLs. Other identifiers can include media content identifiers that identify specific media content items for playback. The media object typically defines both the content and sequence of playback of the music compilation including the sequence of a plurality of media content items, as specified by the creating user of the creating user device 102a. Examples of media objects are discussed in further detail herein.

The digital mixtape can be sent from the creating user from the creating user device 102a to the recipient user device 102b for playback to the recipient user B in various ways. In one example, the media object is sent from the creating user device 102a to the recipient user device 102b, such as by an attachment to an e-mail message, or through a post or message sent through a social networking system, the media delivery system 150, or another messaging or communication system. In another example, a link to the media object can be sent from the creating user device 102a to the recipient user device 102b, such as through an e-mail, social networking system, the media delivery system, or another messaging or communication system. The link can be a URL directed to the media object at the media delivery system 150, for example, which, once selected, causes the media delivery system 150 to send the media object to the recipient user device 102b.

Figure 4:
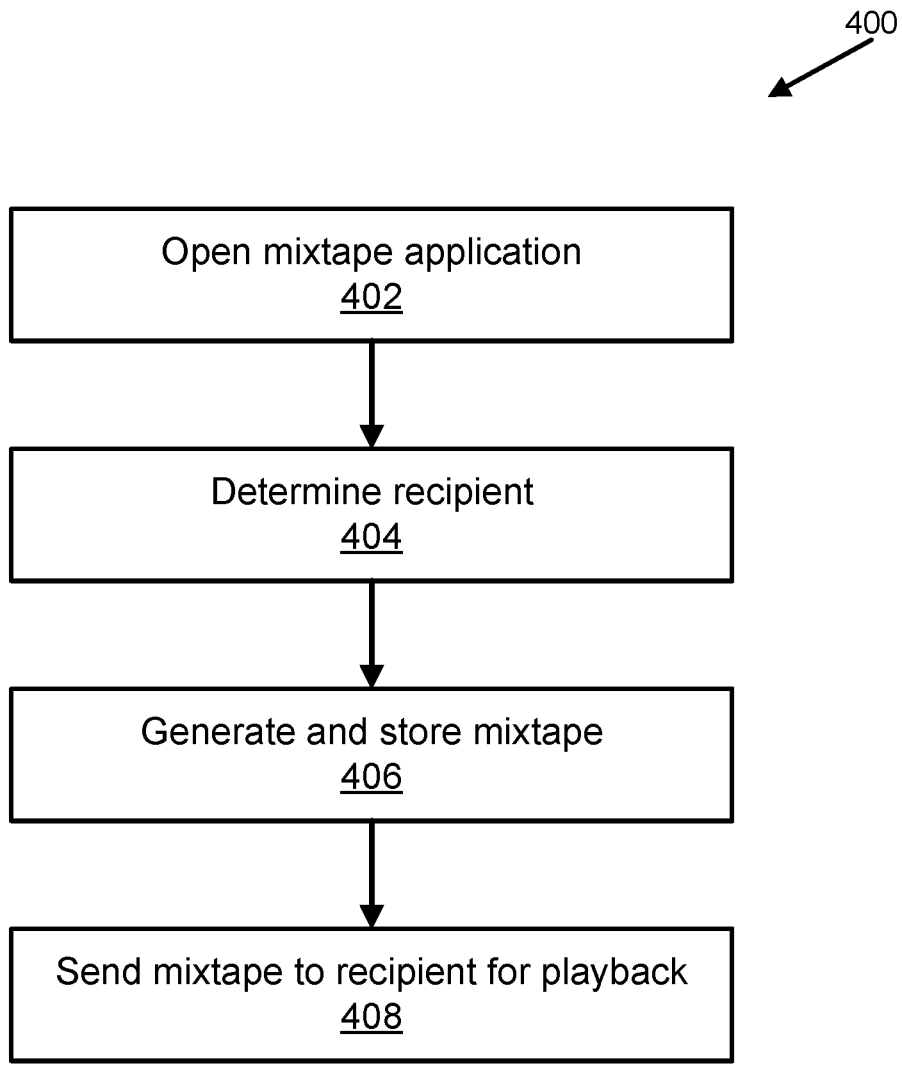
FIG. 4 is a flow chart illustrating an example method of generating and distributing a digital mixtape.

FIG. 4 is a flow chart illustrating an example method of generating and distributing a digital mixtape for sharing with a recipient user. For example, a creating user A creates a digital mixtape to be shared with user B, as shown in FIG. 1. In this example, the method 400 includes operations 402, 404, 406, and 408.

At operation 402, a mixtape application is opened. A user may request to open the mixtape application by selecting a button on a user interface or requesting to open the application by uttering a command.

At operation 404, the recipient user is determined. The creating user A selects who the recipient user is. The recipient user may be a single user, or a plurality of users. In an example, the recipient user must be connected to creating user A (e.g., as a friend or other contact or connection) through the media delivery system 150, or must be (or become) a user of the media delivery system 150. In another example, the recipient user may be identified via an email address. If the recipient user is not connected, the recipient user is sent a link to sign up as a user of the media streaming service. In yet another embodiment, the recipient user can be any person regardless of whether or not the user is registered to the media delivery system 150 or connected with the creating user A.

At operation 406, the digital mixtape is generating and stored. Generating the digital mixtape including adding at least one of an audio recording or a media content item. The digital mixtape may be stored for example, at the media server application 238. The process of creating and storing the digital mixtape is described in more detail at FIG. 5.

It should be noted that operation 404 and operation 406 may be performed in an alternative order, wherein operation 406 occurs before operation 404. For example, a recipient user may be identified after the digital mixtape is generated.

At operation 408, the digital mixtape is sent to the recipient user for playback. In some embodiments, if the recipient user is connected to the creating user through the media delivery system 150 (such as by being indicated as a friend or contact of the recipient user), the digital mixtape can be provided directly to the recipient user using a messaging, posting, or other communication service provided by the media delivery system 150. Alternatively, the digital mixtape can be sent through another messaging or communication system, as discussed herein. In another example, if the recipient user and the creating user are not connected through the media delivery system 150, or if another form of communication is desired, the digital mixtape media object can be sent from the creating user to recipient user through the respective user devices 102. In another possible embodiment, a link to the media object can be sent to the recipient user either through the media delivery system 150 or through another communication system. The link provides the recipient user and the recipient user device 102b with access to the digital mixtape media object, such as to download the media object from the media delivery system 150 to the recipient user device 102b.

Figure 5:
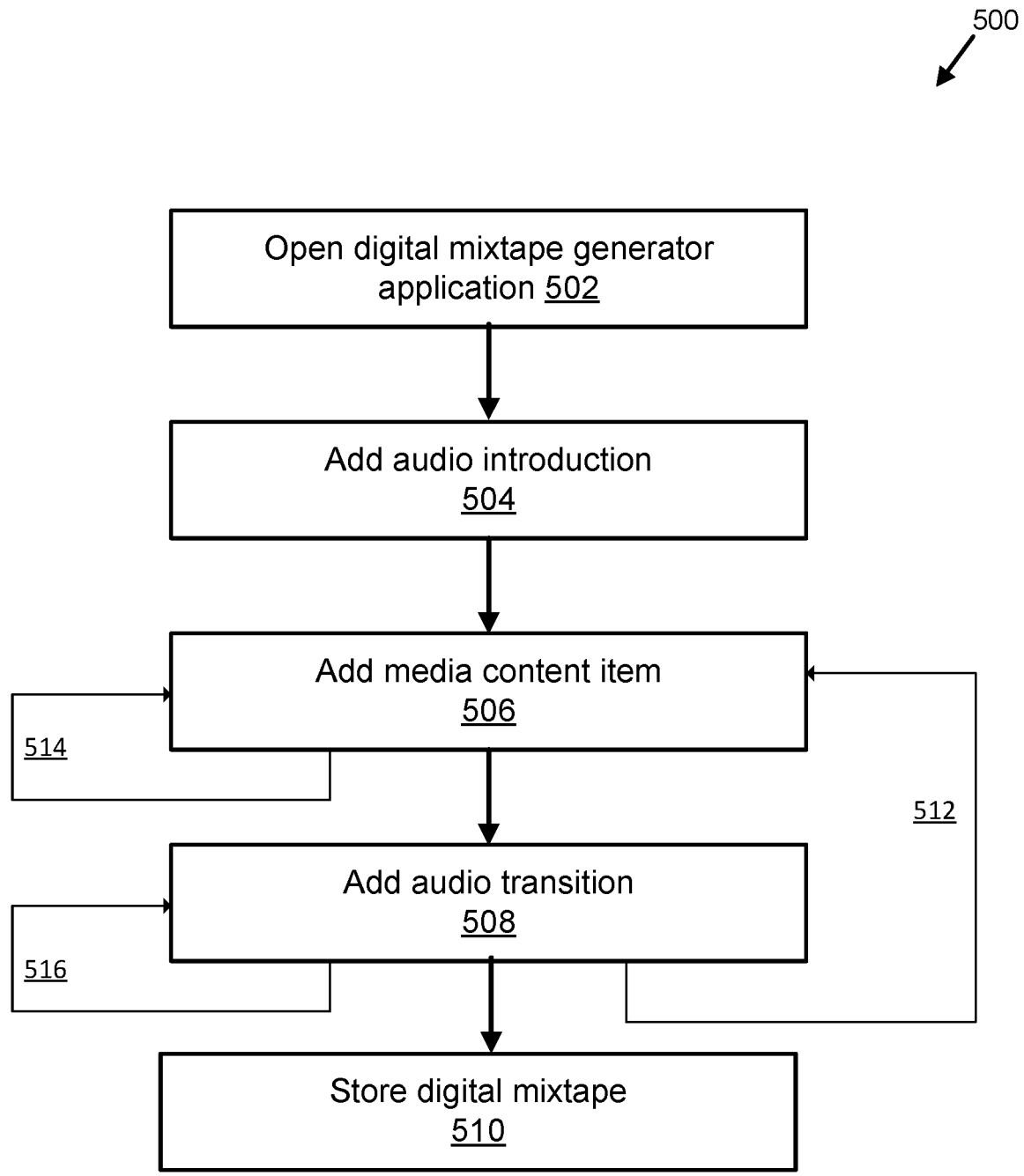
FIG. 5 is a flow chart illustrating an example method of generating a digital mixtape, including an audio introduction, media content items, and audio transitions.

FIG. 5 is a flow chart illustrating an example method of generating a digital mixtape, including an audio introduction, media content items, and audio transitions. The method 500 is an example of the operation 406, shown in FIG. 4. In this example, the method 500 includes operations 502, 504, 506, 508, 510, 512, 514, and 516.

At operation 502, a digital mixtape generator application is initiated (if the application is not already running). In some embodiments, the digital mixtape generator application is a portion of the mixtape application 212, 270 described herein. The digital mixtape generator application can operate on a user device 102 (part of the mixtape application 212, shown in FIG. 2) or on the media server 260 (part of the digital mixtape application 270), or a combination thereof. The digital mixtape generator application allows a creating user to create a compilation of media content items and customized audio recordings to define the digital mixtape and associated media object. Example user interfaces of the digital mixtape generator application are shown at FIGS. 7-10.

In an example, a creating user can add a title and/or a description to the digital mixtape. The title and/or description may be recognized by media delivery system 150, and then songs matching the title and/or description may be used to suggest songs to be added to the digital mixtape. In some embodiments a musical taste profile of the creating user and/or recipient user can be used to suggest songs for inclusion in the digital mixtape.

At operation 504, an audio introduction is added to the digital mixtape. An audio introduction may be an audio recording recorded by the creating user. For example, if the creating user is creating a birthday digital mixtape for a recipient user, the audio recording may be "Happy Birthday User B." Other audio recordings are envisioned. The creating user may record themselves using a mobile device. Still further, the digital mixtape may not include an audio introduction.

At operation 506, a media content item is added to the digital mixtape. Media content items may be selected from media data store 242. The media content item may be the entire media content item or a portion thereof, also referred to as a snippet. A snippet is a portion of a content item that contains less than the entire content item. More than one media content item may be added in sequence. As shown, the method includes adding a first media content item and then at operation 514, another media content item is added without adding an audio transition in between two media content items. Operation 506 and operation 514 may be repeated as many times as desired.

In another embodiment, after the first media content item is added, at operation 508, an audio transition is added. A transition may be an audio recording recorded by the creating user. For example, the creating user may provide an introduction to the next media content item. The creating user may record themselves using a mobile device. The creating user may also record other people or things, such as a dog or a baby. Further, the digital mixtape may not include transitions between each media content items. Still further, the digital mixtape may not include any transitions, and only media content items.

In yet another embodiment, more than one transition may be added in sequence. At operation 516, audio transitions are repeated in sequence. In another embodiment, the method includes adding a first audio transition and then adding another media content item, and repeating this operation 512 as many times as desired.

At 510, the digital mixtape is stored, so that it can be subsequently provided to the recipient user such as described in operation 408 (FIG. 4). In some embodiments, digital mixtapes can be saved with privacy settings. The privacy setting can be private, in which case the digital mixtape is only available to the creating user and the recipient user, or public, in which case the digital mixtape can be consumed by anyone. For example, if the digital mixtape privacy is set to private, the recipient user may be required to log into the media delivery system before the digital mixtape will be played through the media-playback engine 210, for example.

Figure 6:
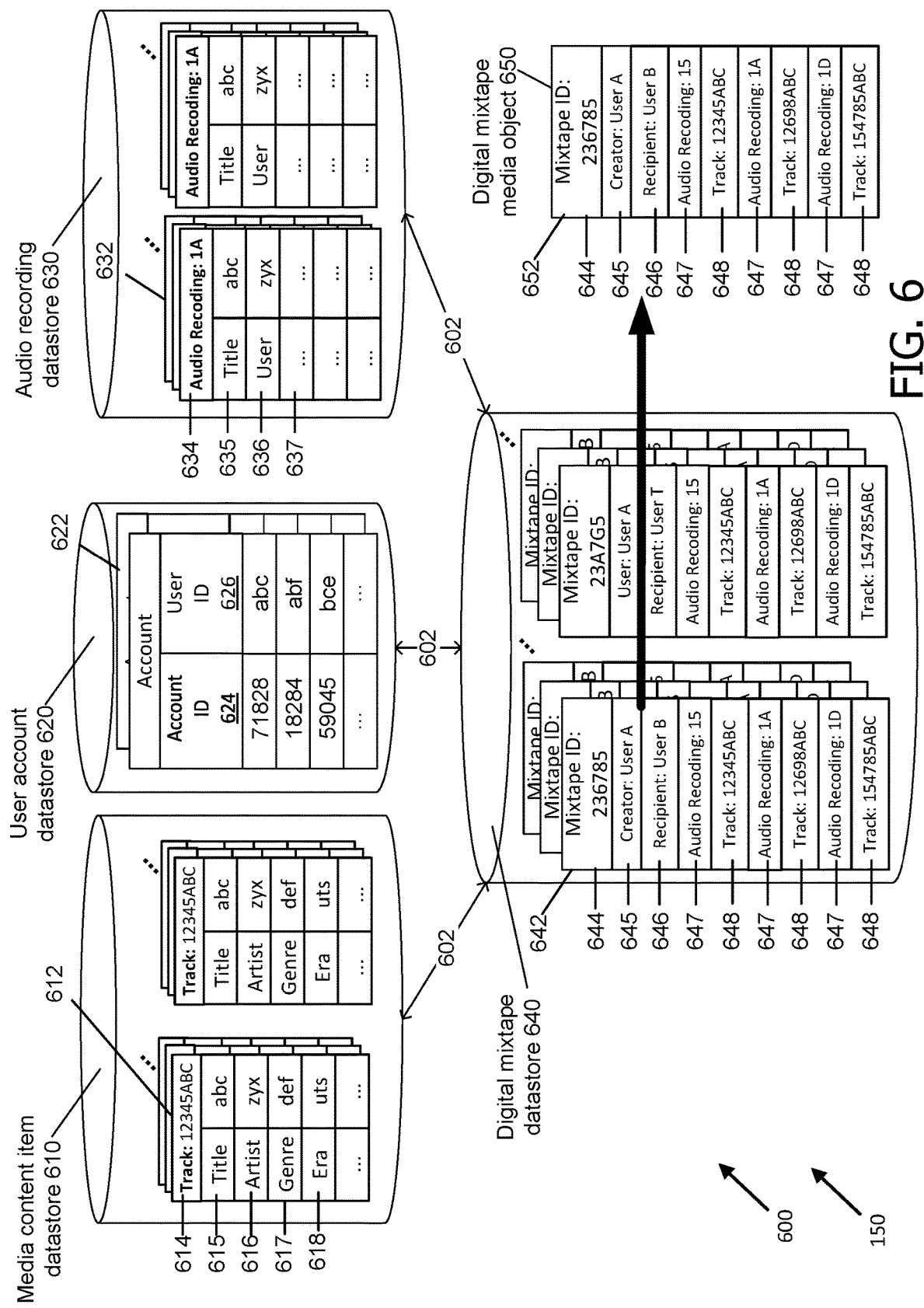
FIG. 6 is a schematic block diagram illustrating an example data storage system usable to generate and distribute a digital mixtape.

FIG. 6 is a schematic block diagram illustrating an example data storage system 600 of the media delivery system 150 usable to generate and distribute a digital mixtape. In this example, the data storage system 600 includes media content item datastore 610, a user account datastore 620, an audio recording datastore 630, and a digital mixtape datastore 640. Communication 602 between the various example data stores of the media delivery system 150 is also illustrated. An example digital mixtape media object 650 is also shown.

In this example, the data storage system 600 includes a plurality of datastores that store data in an organized fashion, such as storing a plurality of tables that store the data and define relationships between the data. In alternative embodiments, the data stored in the media delivery system may also be implemented using other types of database structures.

In this example, the media content item datastore 610 includes at least one media content table 612, which is configured to identify one or more media content items stored at the media delivery system. As illustrated, some embodiments of the media content table 612 can respectively identify a media content item by a media content identifier 614. The media content table 612 contains various pieces of information about corresponding media content items. Examples of such information include a media content title 615, a media content artist 616, a media content genre 617, and a media content era 618. Other information can also be included in the media content table 612 that is related to each of the media content items.

The media content title 615 indicates a title of the media content item. The media content artist 616 indicates one or more artists associated with the media content item. The media content genre 617 indicates a genre associated with the media content item. The media content era 618 indicates an era associated with the media content item. Each of the media content items can be identified by a media content identifier 614.

The user account datastore 620 can be configured to include data usable to identify users of the media delivery system (e.g., a media content provider or a media streaming service). In some embodiments, the user account datastore 620 can be used to store and identify the user account associated with the recipient user. In some embodiments, the user account table 622 can be referenced by one or more of the other tables and/or datastores. Some embodiments of the user account datastore 620 can contain a field for user account identifiers (IDs) 624, and a field for user identifiers (IDs) 626. The user account ID field identifies a plurality of user account IDs 624 associated with the users of the media delivery system 150. The user ID field identifies user IDs 626 associated with the user accounts. The user IDs 626 include names or other identification information that the users can use to identify themselves in the service provided by the media delivery system. The user IDs 626 can be set up by the users or automatically assigned to the users.

Audio recording datastore 630 includes at least one audio recording table 632, which is configured to identify one or more audio recordings 634 stored at the media delivery system. As illustrated, the audio recording table 632 identifies an audio recording 634, audio recording title 635, user 636, and any additional information 637 as needed. The user 636 refers to the user who created the audio recording. Audio recording table 632 may also include other information, such as a recipient user identification. In a first embodiment, only the user who created the audio recording (the user 636 identified in the audio recording table 632) is able to retrieve and add the audio recording to a digital mixtape. Alternatively, a user may opt to make the audio recording public, so other users can use the audio recording. In some embodiments, the audio recording datastore 630 is part of the audio datastore 274, shown in FIG. 2. In some embodiments the audio datastore 274 stores the audio recordings.

Digital mixtape datastore 640 stores information defining the digital mixtapes created by a user for a selected recipient user. In some embodiments, the digital mixtape datastore 640 includes at least one digital mixtape table 642, which stores data defining a digital mixtape 120 (FIG. 1).

In some embodiments, the digital mixtape table 642 includes data fields storing data comprising one or more of: a mixtape identifier 644, a creating user identifier 645, a recipient user identifier 646, one or more audio recording identifiers 647, and one or more media content item identifiers 648. In some embodiments, the digital mixtape table 642 stores a sequence of the audio recording identifiers 647 and the media content item identifiers 648, such that they can be played back to the recipient user in a specific order as defined by the creating user. In another possible embodiment, the digital mixtape table 642 can store the data without specifying a specific sequence for playback.

The mixtape identifier 644 is an identifier of the digital mixtape, such as a unique identification code used by the media delivery system 150 to uniquely identify the digital mixtape.

The creating user identifier 645 identifies which user created the digital mixtape, and can be, for example, the user's name, a username within the media delivery system 150, an address (such as an e-mail address), or a unique identification code used by the media delivery system 150 to uniquely identify the creating user. In some embodiments the creating user identifier 645 is a URL or is included within a URL. In some embodiments the URL is directed to the creating user's user account within the user account datastore 620.

The recipient user identifier 646 identifies the recipient user. As described herein, the digital mixtape is created by a creating user for the recipient user. The recipient user is also the user to whom the digital mixtape is sent, so that the recipient user can consume (i.e., listen to) the digital mixtape. As an example, the recipient user identifier 646 can be the user's name, a username within the media delivery system 150, an address (such as an e-mail address), or a unique identification code used by the media delivery system 150 to uniquely identify the recipient user. In some embodiments the recipient user identifier 646 is a URL or is included within a URL. In some embodiments the URL is directed to the recipient's user account within the user account datastore 620.

The audio recording identifier 647 is used to identify an audio recording 634 created for a digital mixtape. In one example, the audio recording is a customized audio recording created by the creating user (such as by the creating user speaking into a microphone of a user device 102), and stored in the audio recording datastore 630. Each audio recording can have a separate and unique audio recording identifier 647. In some embodiments the audio recording identifier 647 is a unique identifier used by the media delivery system 150 to uniquely identify a specific audio recording. In some embodiments the audio recording identifier 647 is a URL or is included within a URL. In some embodiments the URL is directed to an audio recording of the audio recording datastore 630.

The media content item identifier 648 is used to identify a media content item of the media delivery system 150. The media content item is one of a plurality of media content items stored in the catalog of the media delivery system 150, such as the example media content items 244 stored in media data store 242, shown in FIG. 2. The media content items are not recorded by the creating user, in contrast to the audio recordings. The media content items are typically professionally produced content, such as professionally produced and distributed by a record company. Each media content item in the catalog can have a separate and unique media content identifier 648. In some embodiments the media content item identifier 648 is a URL or is included within a URL. In some embodiments the URL is directed to a media content item of the media content item datastore 610.

In some embodiments, a media object 650 is generated for a digital mixtape. In some embodiments, the media object 650 is a data package 652, such as a data file, that contains information usable to playback the digital mixtape to the recipient. In this example, the digital mixtape media object 650 includes data fields that store data defining the digital mixtape, such as data within the digital mixtape table 642 of the digital mixtape datastore 640. In some embodiments the media object is, or is generated from, the digital mixtape table 642, which is packaged in a data package 652 so that it can be transmitted to the recipient user. In some embodiments the media object 650 includes one or more of: the mixtape identifier 644, the creating user identifier 645, the recipient user identifier 646, one or more audio recording identifiers 647, and one or more media content item identifiers 648. In some embodiments the media object 650 defines both the content and sequence of audio recordings and media content items for a digital mixtape.

In some embodiments a link is generated for the media object 650. The link can be sent to the recipient user B (e.g., from the creating user or by the media delivery system 150) to allow the recipient user B to access the media object 650, such as to download the media object from the media delivery system 150 to the recipient user device 102*b*.

The data storage system 600 can include one or more data storage devices that store the datastores shown in FIG. 6. The data storage devices can be local or remote (e.g., cloud-based) data storage. In some embodiments the data storage devices are part of or in data communication with a server computing device, such as the media server 260 shown in FIG. 2. The data storage system 600 can be associated with a single media server 260, or distributed across a plurality of media servers.

Figure 7:
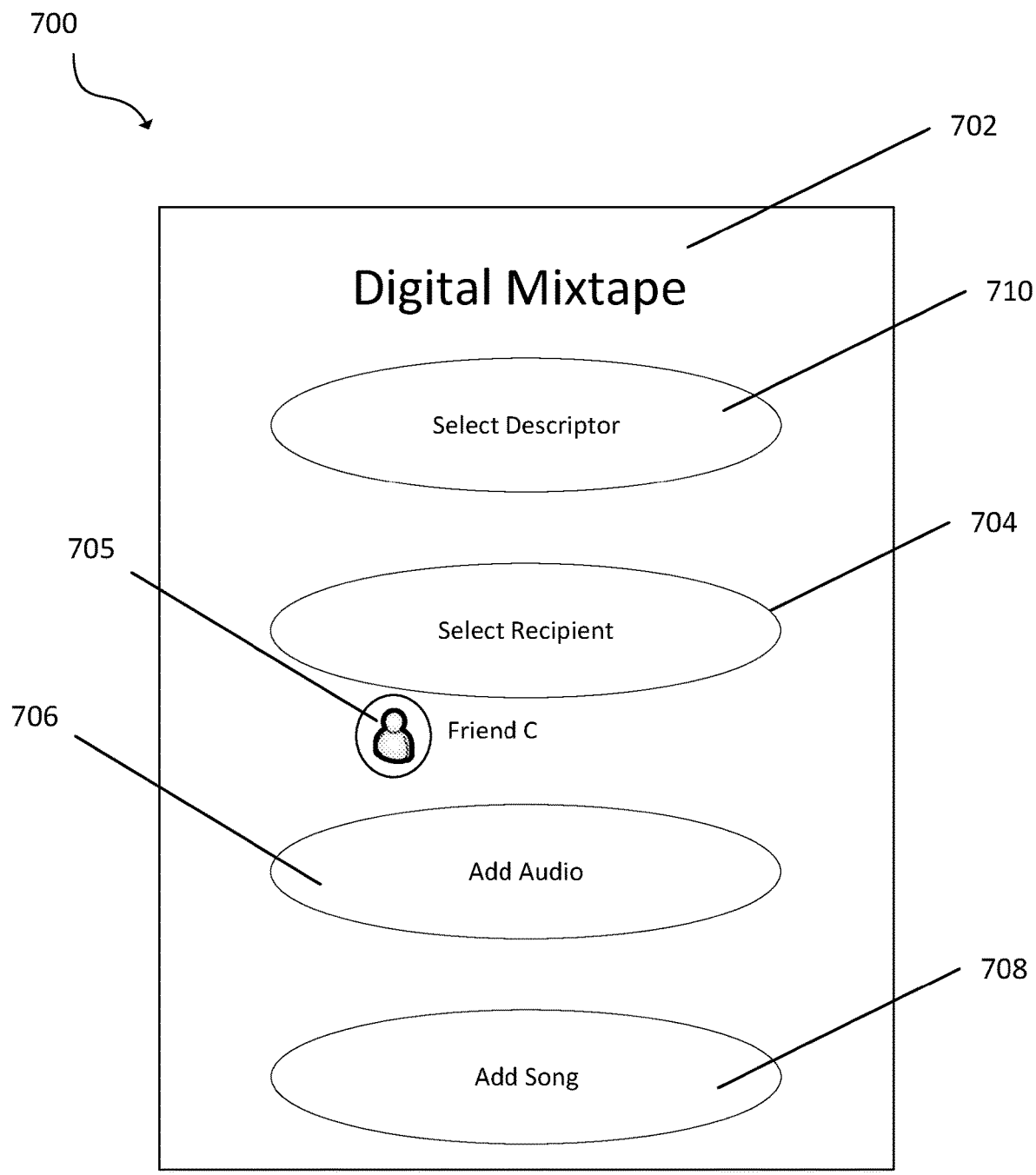
FIG. 7 illustrates an example user interface that guides the creating user through the generation and distribution of the digital mixtape.

FIG. 7 illustrates an example user interface 700 that guides the creating user through the generation and distribution of the digital mixtape. The user interface 700 can be generated by the mixtape application 212 or 270, for example, and displayed on a user device 102*a* (FIG. 1), which is used by the creating user to define the digital mixtape for the recipient user.

In this example, the user interface 700 includes a title 702, which may be entered or changed by the creating user. In an example, the title 702 is associated with a media content descriptor. In an alternative embodiment, the user selects a descriptor button 710. The descriptor button 710 allows a user to select a media content descriptor. A media content descriptor may be selected from a time-based descriptor (e.g., "morning" as in "select media content items for listening to in the morning"), a location-based descriptor (e.g., "Paris" as in "send him something for his trip to Paris, and deliver it when he lands"), or a theme-based descriptor (e.g., "dance party" as in "send him songs to dance to at a party").

In an example, the media content descriptor is used to recommend media content items to be added to the digital mixtape. In another example, the media content descriptor is used to automatically add matching media content items to the digital mixtape. Matching media content items include items having an attribute that matches the media content descriptor.

The user interface 700 in this example includes a select recipient button 704, an add audio button 706, and an add song button 708. It should be noted that any type of media content items may be added, but songs are used for illustrative purposes only. In the example shown, a recipient user 705 has been selected as "friend C." In a first embodiment only one recipient user may be selected; however, in another embodiment, more than one recipient user may be selected.

In some embodiments, the creating user individually selects all the media content items to be added to the digital mixtape. In another embodiment, the media content items are automatically selected. In an example, at least one media content item is selected from a catalog of media content items based on the media content descriptor and the user information of the recipient user.

In an alternative embodiment, a user is able to create a digital mixtape by uttering a request. The mixtape application receives an utterance of the user request to create a mixtape. Then the utterance is converted to text and processed to identify the command intent. Further, the creating user may indicate which user is the recipient user by uttering a user identifier. In such examples, speech-recognition technology is used to identify words spoken by the user. The words are recognized as commands that affect the behavior of the recipient user device. Natural language processing and/or intent-recognition technology are usable to determine appropriate actions to take based on the spoken words.

Figure 8:
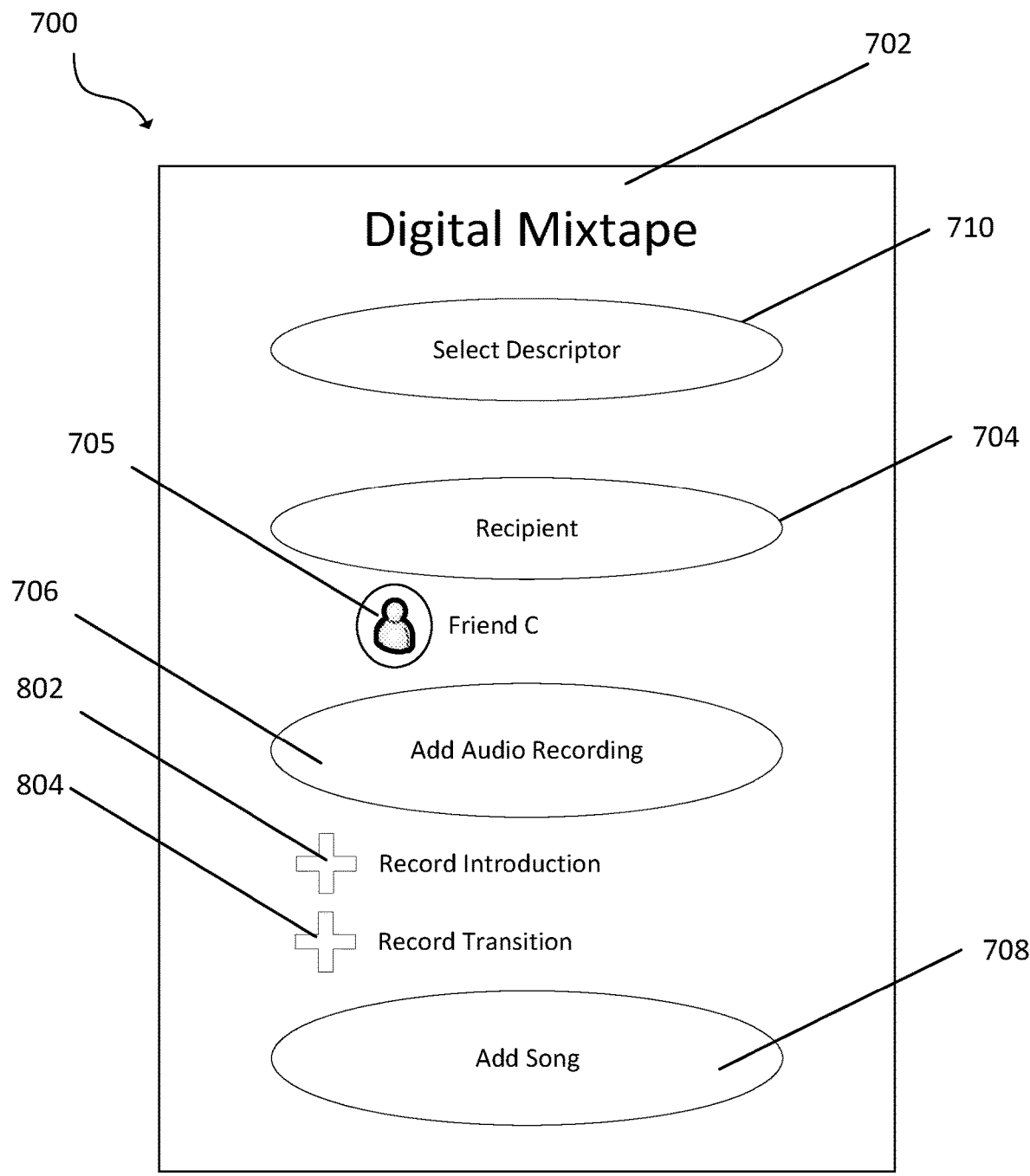
FIG. 8 further illustrates the example user interface shown in FIG. 7.

FIG. 8 further illustrates the user interface 700 for creating a digital mixtape, and further illustrates the adding of audio recordings to the digital mixtape. The user interface 700 includes, in this example, a button 802 for recording an introduction, and a button 804 for recording transitions. For example, when a user wants to record a personalized introduction the user presses button 802, which allows a creating user to record an introduction and store it at the audio recording datastore of the media delivery system. The creating user is also able to press button 804 to record a transition, which is stored at the audio recording datastore of the media delivery system. A creating user may record as many introductions or transitions as desired; however, no introduction or transitions are required. Still further, a creating user need not include all the audio recordings in the digital mixtape.

In an alternative embodiment, a creating user can utter a request to create an audio recording. The utterance is converted to text and processed to identify the intent. Then, the user is able to record the audio recording. The user request may be obtained in response by the user to a questionnaire provided by a voice assistant system. As described above, speech-recognition technology is used to identify words spoken by the user.

Figure 9:
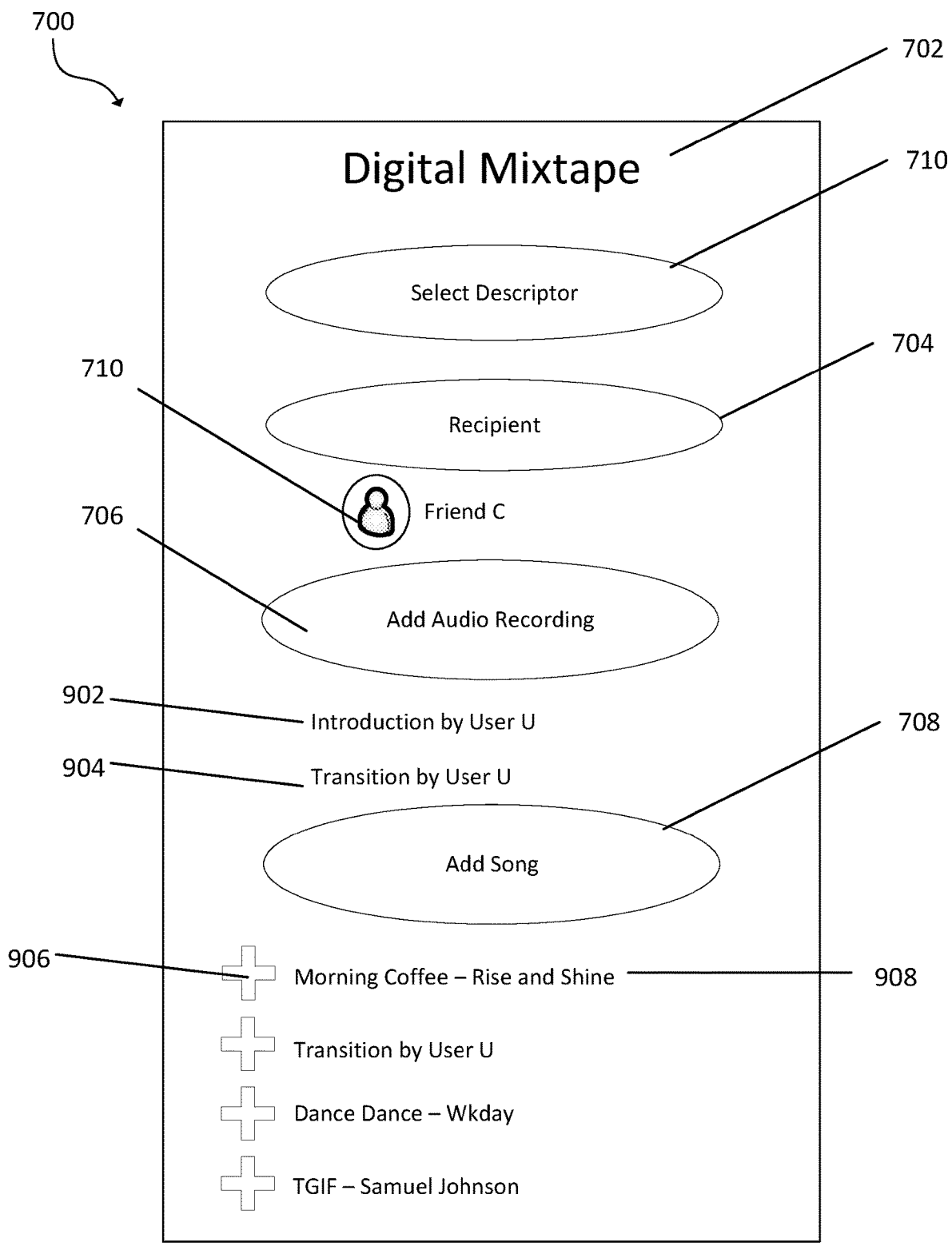
FIG. 9 illustrates another example of the user interface shown in FIG. 7.

FIG. 9 illustrates another example of the user interface 700 after the creating user A has selected the recipient user and recorded audio recordings. The user interface 700 includes the recipient user 704, an introduction 902 added by the creating user, and a transition 904 by the creating user. While a creating user can still change the recipient user and/or add more audio recordings, adding songs to the mixtape is the focus on FIG. 9.

The creating user is able to add songs by selecting button 708. In one example, no songs are initially presented (or listed) on the user interface 700. Instead, a creating user must select the add song button 708 and search through the catalog of songs available on the media delivery system.

In another embodiment, songs are presented by shortcuts, which allows a user to more quickly identify songs that they want to add to the digital mixtape, and to select the shortcut to add the content to the digital mixtape. The songs identified with the shortcuts may be songs that appear in other playlists together with songs that have already been added to the digital mixtape, have appeared in other digital mixtapes together, or may have something in common with title of the digital mixtape or the listening history of the creating or recipient user. The example user interface 700 shown in FIG. 9 includes shortcuts such as an add song button 906 that can be selected to identify and add a specific song 908.

In yet another embodiment, a creating user can speak (also sometimes referred to as "utter") the name or a song to be added to the digital mixtape, and the utterance is then processed by the mixtape application 212 and/or 270, such as in cooperation with the NLU system 272 (shown in FIG. 2). The utterance is converted to text and processed to identify the intent. After the song has been identified, the creating user is able to confirm by voice if the correct song has been identified. If the correct song has been identified, then the song is added to the digital mixtape. As described herein, speech-recognition technology is used in some embodiments to identify words spoken by the user.

Figure 10:
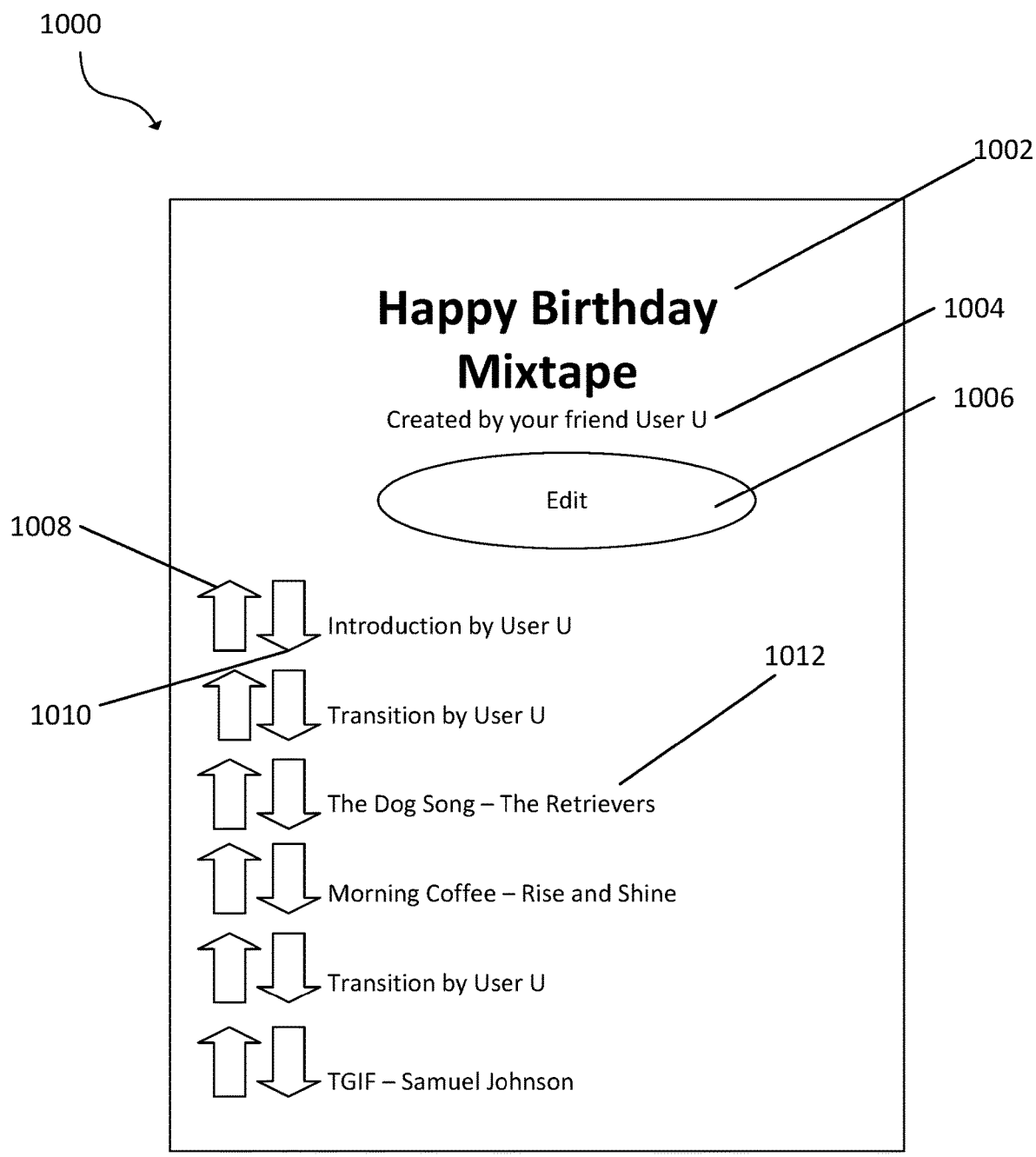
FIG. 10 illustrates an example user interface for previewing and rearranging the sequence of the digital mixtape content.

FIG. 10 illustrates an example user interface 1000 for previewing and rearranging a sequence of the digital mixtape content before the digital mixtape is shared with recipient user. The digital mixtape has a title 1002 "Happy Birthday Digital mixtape," and shows that it is created by "User U" 1004. An edit button 1006 allows the creating user to edit the digital mixtape as desired before being sent to recipient user. When selecting the edit button 1006, the creating user may be brought back to any of the previous user interfaces shown in FIGS. 7-9, which allows a user to change the title of the digital mixtape, the recipient user, add or remove introductions, add or remove transitions, and/or add or remove songs.

FIG. 10 also includes the ability to change the order of introductions, transitions, and songs added to the digital mixtape. An up button 1008 allows the creating user to move the item 1012 up in the digital mixtape order, while down button 1010 allows the creating user to move the item down in the digital mixtape order.

The creating user is also able to at least partially overlap the user-generated audio recording with a media content item. For example, the creating user may record a transition that is to be played over the introduction of a song. The overlapped content can be combined, such as by mixing.

The creating user can also change the order of audio recordings and songs by uttering a command. The utterance is converted to text and processed to identify the intent. In a first example, the creating user identifies the item 1012 to be moved, and whether or not the item is to be moved up or down in order. The creating user can then confirm the correct position of the item 1012 after it has been moved.

Figure 11:
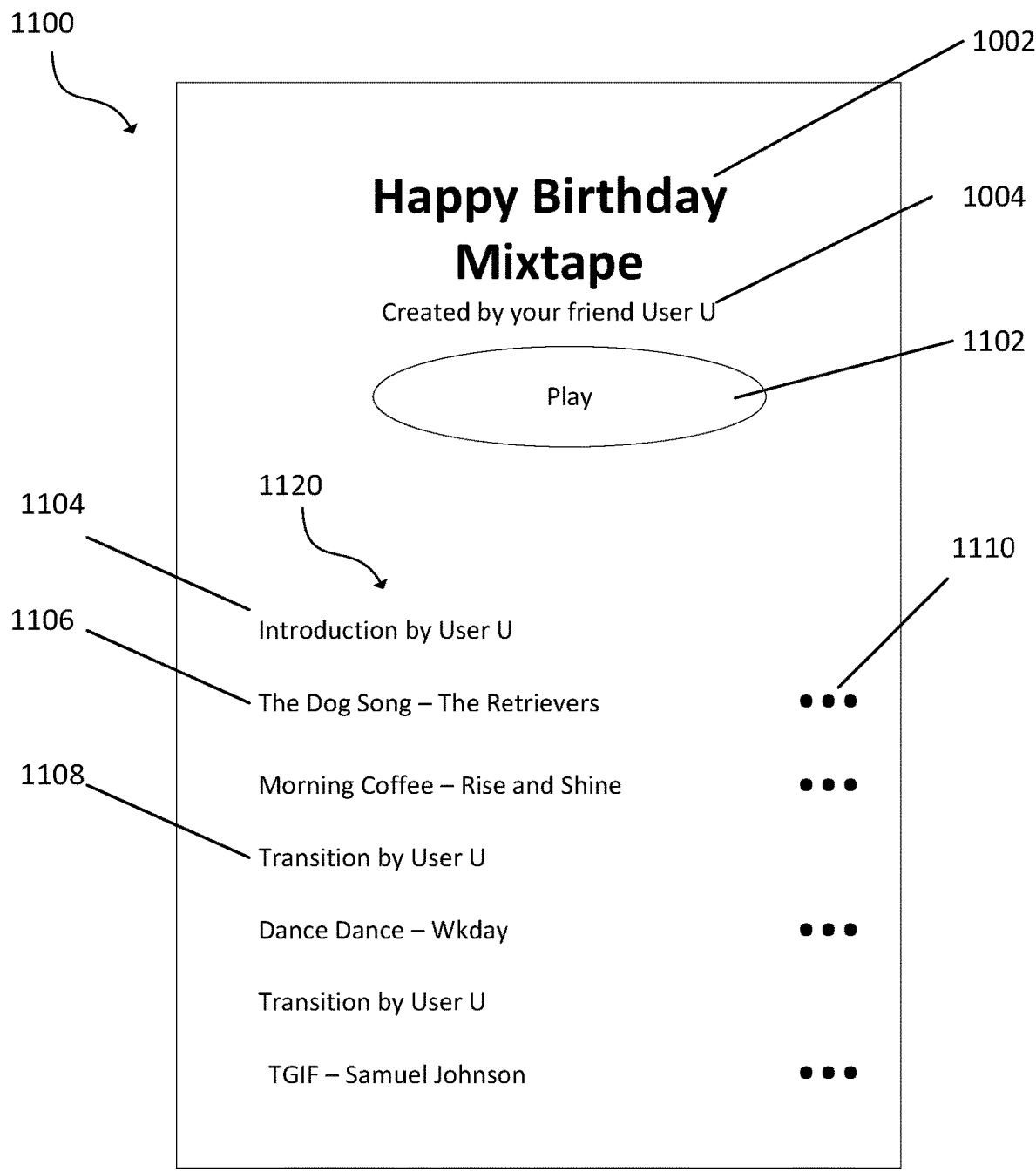
FIG. 11 illustrates an example user interface for playing the digital mixtape to the recipient user.

FIG. 11 illustrates an example user interface 1100 for playing the digital mixtape to the recipient user, such as on the recipient user device 102*b*.

The example user interface 1100 includes the title 1002, and identification of the creating user 1004, and a play button 1102. The user interface 1100 also includes a list 1120 of the audio items and the songs included in the digital mixtape. For example, the list 1120 first includes and introduction 1104, followed by a song 1106, another song, and a transition 1108. In a first embodiment, the digital mixtape is played in the order selected by the creating user. In another embodiment, the digital mixtape may include a shuffle play option.

The recipient user is also able to select button 1110, which provides more information about that song. However, this button may or may not be available for audio pieces recorded by the creating user.

In some embodiments the user interface 1100 is generated on the recipient user device 102*b* upon selecting a link to or opening the media object associated with the digital mixtape, which causes the media-playback engine 210 (FIG. 1) to obtain the media object for the digital mixtape 120, and display the user interface 1100 for playback of the digital mixtape 120 to the recipient user B. The content of the digital mixtape can be transmitted in full to the media-playback engine 210, or can be played by streaming the content from the media delivery system 150, for example.

Various operations and processes described herein can be performed by the cooperation of two or more devices, systems, processes, or combinations thereof.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for generating a digital mixtape including a user-defined compilation of a plurality of media content for sharing with another user, the method comprising: displaying a view of a user interface on a creating user device associated with a creating user, wherein the view includes: a descriptor button selectable by the creating user to select media content descriptors, a recipient button selectable by the creating user to select recipient users, an add audio button selectable by the creating user to add user-generated audio recordings, and an add media content button selectable by the creating user to select media content items; receiving a user request to generate the digital mixtape from the creating user via the view, the user request including information identifying at least one recipient user and a first media content descriptor; determining user information of the recipient user, the user information including a listening history of the recipient user; determining a first media content item to be included in the digital mixtape based on the first media content descriptor and the user information of the recipient user; receiving a second media content descriptor from the creating user; determining a second media content item to be included in the digital mixtape based on the second media content descriptor; obtaining at least one user-generated audio recording from the creating user to be included in the digital mixtape; generating a digital media object data package of the digital mixtape identifying the first and second media content items and the at least one user-generated audio recording; and providing the recipient user with access to the digital media object data package to play back the first and second media content items and the at least one user-generated audio recording.

2. The method of claim 1, wherein receiving a user request includes:
receiving an utterance of the user request;
converting the utterance to text; and
processing the text to identify a command intent and a plurality of slots, the plurality of slots identifying the user information of the recipient user and the first and second media content descriptor, the command intent representative of a request for generating and sharing the user-defined compilation of media content.

3. The method of claim 1, wherein receiving a user request includes:
receiving text of the user request from the creating user; and
processing the text to identify a command intent, the user information of the recipient user other user identification information, and the first media content descriptor, the command intent representative of a request for generating and sharing the user-defined compilation of media content.

4. The method of claim 1, wherein determining the first and second media content item comprises:
selecting the first and second media content item from a catalog of media content items, the first and second media content items having an attribute that matches the media content descriptor.

5. The method of claim 1, wherein the first and second media content descriptor includes at least one of a time-based descriptor, a location-based descriptor, and a theme-based descriptor.

6. The method of claim 1, wherein the user request is obtained from at least one response by the creating user to a questionnaire provided by a voice assistant system.

7. The method of claim 1, wherein providing the recipient user with access to the media object data package includes:
transmitting an identifier for the media object to a computer device operated by the recipient user.

8. The method of claim 1, wherein providing the recipient user with access to the media object data package includes:
transmitting the media object data package to a computing device operated by the recipient user for playback.

9. The method of claim 1, wherein providing the recipient user with access to the media object data package includes:
streaming the media object data package to a computing device operated by the recipient user for playback.

10. The method of claim 1, further comprising:
at least partially overlapping the first media content item and the at least one user-generated audio recording.

11. The method of claim 1, further comprising:
retrieving user account data of the creating user, the user account data including information for identifying one or more users associated with the creating user; and
identifying the recipient user from the user account data.

12. A system for providing a digital mixtape including a user-defined compilation of a plurality of media content items for sharing with another user, the system comprising: a media streaming application stored in memory of a voice interactive device; a media server in communication with the media streaming application, the media server including: a memory processing unit; and a memory storing instructions that, when executed by the processing unit, causes the media server to: display a view of a user interface on a creating user device associated with the creating user, wherein the view includes: a descriptor button selectable by the creating user to select media content descriptors, a recipient button selectable by the creating user to select recipient users, an add audio button selectable by the creating user to add user- generated audio recordings, and an add media content button selectable by the creating user to select media content items; receive a user request to generate the digital mixtape from the creating user via the view, the user request including information identifying at least one recipient user and a first media content descriptor; determine user information of the recipient user, the user information including a listening history of the recipient user; determine a first media content item to be included in the digital mixtape based on the first media content descriptor and the user information of the recipient user; receive a second media content descriptor from the creating user; determine a second media content item to be included in the digital mixtape based on the second media content descriptor; obtain at least one user-generated audio recording from the creating user to be included in the digital mixtape; generate a digital media object data package of the digital mixtape identifying the first and second media content items and the at least one user-generated audio recording; and provide the recipient user with access to the digital media object data package to playback the first and second media content item with the at least one user-generated audio recording.

13. The system of claim 12, wherein the instructions that cause the media server to receive a user request further cause the media server to:
receive an utterance of the user request;
convert the utterance to a text; and
process the text to identify a command intent and a plurality of slots, the plurality of slots identifying the user information of the recipient user and the first and second media content descriptor, the command intent representative of a request for generating and sharing the user-defined compilation of media content.

14. The system of claim 12, wherein the instructions that cause the media server to receive a user request further cause the media server to:
receive a text of the user request from the creating user; and
process the text to identify a command intent, the user information of the recipient user, and the first media content descriptor, the command intent representative of a request for generating and sharing the user-defined compilation of media content.

15. The system of claim 12, wherein the instructions that cause the media server to determine the first and second media content item further cause the media server to:
select the first and second media content item from a catalog of media content items, the first and second media content items having an attribute that matches the media content descriptor.

16. The system of claim 12, wherein the first and second media content descriptor includes at least one of a time-based descriptor, a location-based descriptor, and a theme-based descriptor.

17. The system of claim 12, wherein the instructions that cause the media server to provide the recipient user with access to the media object data package further cause the media server to:
transmit an identifier for the media object to a computer device operated by the ether recipient user.

18. The system of claim 12, wherein the instructions that cause the media server to provide the recipient user with access to the media object data package further cause the media server to:
transmit the media object data package to a computing device operated by the recipient user for playback.

19. The system of claim 12, wherein the instructions that cause the media server to provide the recipient user with access to the media object data package further cause the media server to:
stream the media object data package to a computing device operated by the recipient user for playback.

20. The method of claim 1, further comprising, causing a user device associated with the creating user to display a user interface for previewing an order of the digital mixtape before generating the digital media object package.

21. The method of claim 20, further comprising receiving a selection to rearrange the order of the digital mixtape from the creating user.

22. The method of claim 1, wherein receiving the user request to generate the digital mixtape from the creating user, the user request including information identifying at least one recipient user and the first media content descriptor comprises:
causing a user device associated with the creating user to display a user interface for selecting the first media content descriptor from a plurality of media content descriptors; and
receiving a selection from the creating user identifying the first media content descriptor.

23. The system of claim 12, wherein the recipient user does not interact with the system to generate the digital mixtape.

24. The system of claim 12, wherein only the creating user interacts with the system to generate the digital mixtape.

25. The method of claim 1, wherein the digital media object package comprises:
a mixtape identifier operable to identify the digital mixtape;
a creating user identifier operable to identify the creating user;
one or more recipient user identifiers operable to identify the at least one recipient user;
one or more audio recording identifiers operable to identify the at least one user- generated audio recording; and
one or more media content item identifiers operable to identify the first media content item and the second media content item.

26. The method of claim 1, further comprising storing the digital media object package in a digital mixtape datastore.

27. The method of claim 1, wherein: receiving the user request is in response to the creating user selecting the descriptor button to select the first media content descriptor and selecting the recipient button to select the at least one recipient user.

28. The method of claim 1, wherein:
obtaining the at least one user-generated audio recording is in response to the creating user selecting the add audio button to add the at least one user-generated audio recording.

* * * * *